US012280597B2

(12) United States Patent
Thielman et al.

(10) Patent No.: US 12,280,597 B2
(45) Date of Patent: Apr. 22, 2025

(54) PRINT HEAD MAINTENANCE ASSEMBLY

(71) Applicant: Hewlett-Packard Development Company, L.P., Spring, TX (US)

(72) Inventors: Jeffrey L. Thielman, Sant Cugat del Valles (ES); Alejandro Mielgo Barba, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 190 days.

(21) Appl. No.: 17/906,506

(22) PCT Filed: Mar. 17, 2020

(86) PCT No.: PCT/US2020/023116

§ 371 (c)(1),
(2) Date: Sep. 16, 2022

(87) PCT Pub. No.: WO2021/188095

PCT Pub. Date: Sep. 23, 2021

(65) Prior Publication Data

US 2023/0114087 A1 Apr. 13, 2023

(51) Int. Cl.
*B41J 2/165* (2006.01)
*B41J 29/17* (2006.01)

(52) U.S. Cl.
CPC ....... *B41J 2/16538* (2013.01); *B41J 2/16508* (2013.01); *B41J 2/16511* (2013.01); *B41J 2/16544* (2013.01); *B41J 2/16547* (2013.01); *B41J 29/17* (2013.01)

(58) Field of Classification Search
CPC ................ B41J 2/16538; B41J 2/16511; B41J 2/16544; B41J 2/16547; B41J 2/16508; B41J 29/17; B41J 2/165
See application file for complete search history.

(56) References Cited

U.S. PATENT DOCUMENTS

| | | | |
|---|---|---|---|
| 5,640,182 | A | 6/1997 | Bahrami et al. |
| 7,552,994 | B2 | 6/2009 | Hsu |
| 7,556,342 | B2 | 7/2009 | Hamano |
| 8,128,195 | B2 | 3/2012 | Hendricks et al. |
| 8,398,205 | B2 | 3/2013 | Roth et al. |
| 9,676,195 | B2 | 6/2017 | Coma Vives et al. |

(Continued)

FOREIGN PATENT DOCUMENTS

| | | | |
|---|---|---|---|
| CN | 1655938 | A | 8/2005 |
| CN | 103101309 | A | 5/2013 |

(Continued)

*Primary Examiner* — Geoffrey S Mruk
(74) *Attorney, Agent, or Firm* — Jordan IP Law, LLC

(57) ABSTRACT

Disclosed herein is a print head maintenance cartridge, a printing device and a method of cleaning a print head. The print head maintenance assembly comprises a maintenance cartridge that is movable along a first direction and a wiper assembly comprising a wiper element for wiping a print head. The wiper element extends along the first direction. The maintenance cartridge comprises a guide rail extending along the first direction. The guide rail is to engage with the wiper assembly to adjust a position of the wiper element depending on a relative position between the maintenance cartridge and the wiper assembly in the first direction.

9 Claims, 7 Drawing Sheets

(56) References Cited

U.S. PATENT DOCUMENTS

| | | | | |
|---|---|---|---|---|
| 2003/0179261 | A1 | 9/2003 | Uwagaki et al. | |
| 2006/0197798 | A1 | 9/2006 | Hsu | |
| 2006/0244780 | A1 | 11/2006 | Hsieh | |
| 2007/0115320 | A1 | 5/2007 | Takahashi et al. | |
| 2010/0026756 | A1 | 2/2010 | Geserich | |
| 2011/0057990 | A1* | 3/2011 | Heo | B41J 2/16547 347/33 |
| 2011/0316928 | A1 | 12/2011 | Roth et al. | |
| 2016/0288508 | A1 | 10/2016 | Kuno | |
| 2018/0147850 | A1 | 5/2018 | Ogawa | |

FOREIGN PATENT DOCUMENTS

| | | | |
|---|---|---|---|
| DE | 4000414 | A1 | 7/1991 |
| EP | 1346830 | A2 | 9/2003 |
| JP | 3047128 | U | 3/1998 |

* cited by examiner

PRINT HEAD MAINTENANCE ASSEMBLY

BACKGROUND

Printing devices like ink jet printers may have to be cleaned regularly in order to prevent a deterioration of image quality e.g. due to partial or complete clogging of print head nozzles or due to contaminants accumulating on a nozzle plate of the print head. To this end, printing devices may comprise a maintenance subsystem, which performs cleaning operations on a print head of the printing device.

BRIEF DESCRIPTION OF DRAWINGS

In the following, a detailed description of various examples is given with reference to the figures. The figures show schematic illustrations of FIG. 1*a:* a print head maintenance assembly according to an example in side view.

DETAILED DESCRIPTION

A print head of a printing device may for example be cleaned by wiping the print head with a wiper to remove contaminants like dirt particles, dried ink or paper fibers, which may accumulate on the print head e.g. during manufacture, transport, or printing. To this end, a printing device may comprise a maintenance assembly with a wiper plate. In some examples, the wiper plate may be oriented perpendicular to a scanning direction of the print head such that a wiping operation may for example be performed by moving the print head back and forth across the wiper plate. For this, the wiper plate may be moved into the print head path, e.g. by mounting the wiper plate on an actuated maintenance cartridge. With the increasing size of print heads, larger wiper plates may be used, which may cause issues due to space constraints within the printing device.

Figure 1A:
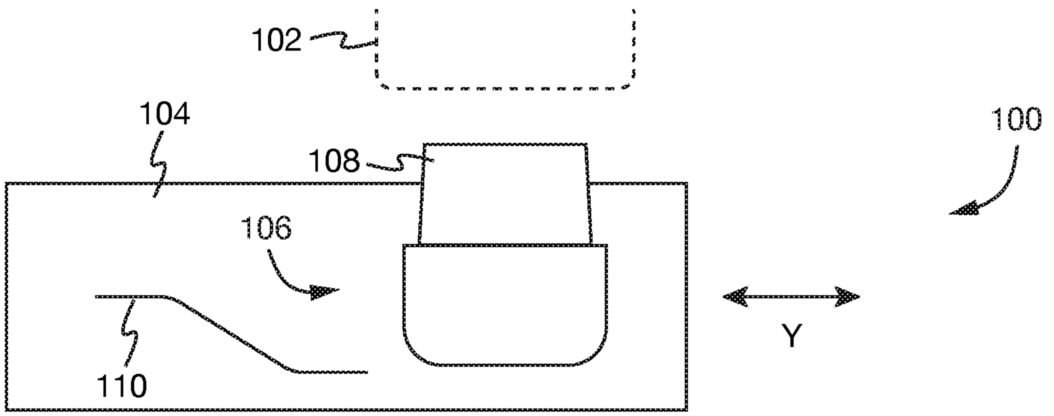
FIG. 1*b:* the print head maintenance assembly of FIG. 1*a* with the guide rail engaged with the wiper assembly in accordance with an example.
FIG. 1*c:* the print head maintenance assembly of FIG. 1*a* with the wiper assembly in an engaged position according to an example.

FIG. 1*a* shows a schematic illustration of a print head maintenance assembly 100 according to an example in side view. The print head maintenance assembly 100 may for example be employed in or be part of a printing device (not shown) such as a large-format ink-jet printer, e.g. to clean a print head 102. In one example, the print head maintenance assembly 100 may be used in the printing device 500 described below with reference to FIG. 5.

The print head maintenance assembly 100 comprises a maintenance cartridge 104 that is movable along a first direction as indicated by the arrow labeled "Y" in FIG. 1*a*. In the following, the first direction may thus also be referred to as the Y direction. The maintenance cartridge 104 may for example comprise an actuator such as an electric motor or may be coupled to an actuator, e.g. via a drive belt or a worm drive. In some examples, the first direction may be perpendicular to a scanning direction of the print head 102, which may e.g. be parallel to the direction of view in FIG. 1*a*. In the context of this disclosure, the scanning direction of the print head 102 may also be referred to as the X direction. In some examples, the maintenance cartridge 104 or at least a part thereof may be a user-replaceable item for a printing device. In other examples, the maintenance cartridge 104 may not be removable, but may be permanently installed in a printing device.

The print head maintenance assembly 100 further comprises a wiper assembly 106 with a wiper blade or wiper element 108 for wiping the print head 102. The wiper element 108 extends along the Y direction. In some examples, the wiper element 108 may be oriented perpendicular to the scanning direction of the print head 102 and may thus also be referred to as a crosswipe. The wiper assembly 106 may not be mounted on or rigidly attached to the maintenance cartridge 104. Instead, the wiper assembly 106 may for example be mounted on or attached to a support frame (not shown) of the print head maintenance assembly 100 or of a printing device, e.g. as described below with reference to FIGS. 3 and 4. Accordingly, the maintenance cartridge 104 may be moved without moving the wiper element 108 or the wiper element 108 may be moved relative to the maintenance cartridge 104, in some examples.

The maintenance cartridge 104 comprises a guide rail 110 that extends along the Y direction. The guide rail no is to engage with the wiper assembly 106 to adjust a position of the wiper element 108 depending on a relative position between the maintenance cartridge 104 and the wiper assembly 106 in the Y direction. In other words, the guide rail 110 may provide a mechanical contact between the wiper assembly 106 and the maintenance cartridge 104 such that a motion of the maintenance cartridge 104 along the Y direction may induce a motion of the wiper element 108. The guide rail 110 may for example engage with the wiper assembly 106 when the maintenance cartridge 104 is within a certain range along the Y direction. The guide rail no may for example comprise a guiding surface extending outwards from a side wall of the maintenance cartridge 104 in the direction of view of FIG. 1*a* and extending along the side wall of the maintenance cartridge 104 in the Y direction. In some examples, the guide rail no may be a guiding cam that is to engage with a cam follower of the wiper assembly 106. The guide rail 110 may extend over the entire length of the maintenance cartridge 104 along the Y direction or over a fraction of the length of the maintenance cartridge 104 as illustrated in FIG. 1*a,* e.g. between 20% and 100%, in one example between 70% and 100% of the length of the maintenance cartridge 104.

Figure 1B:
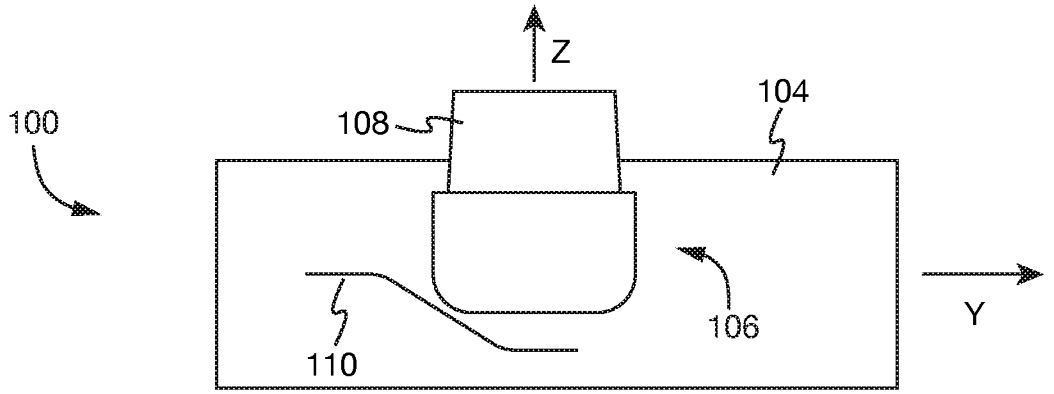

An example for this is illustrated in FIG. 1*b,* which depicts the print head maintenance assembly 100 with the guide rail 110 being engaged with the wiper assembly 106. The guide rail no may for example comprise a surface that is inclined relative to the Y direction, wherein the guide rail 110 may e.g. be arranged on a side face or an edge of the maintenance cartridge 104 that extends parallel to the Y direction and faces the wiper assembly 106. An inclination angle of the inclined surface relative to the Y direction may for example be between 10° and 45°. As the maintenance cartridge 104 is moved along the Y direction, the inclined surface of the guide rail 110 may come in contact with the wiper assembly 106. When the maintenance cartridge 104 is moved further along the Y direction, the inclined surface may exert a force on the wiper assembly 106 and may thereby move the maintenance assembly 106 in a second direction as illustrated by the arrow labeled "Z" in FIG. 1*b*. The second direction, which may also be referred to as the Z direction in the following, may be perpendicular to the first or Y direction in some examples and may be the vertical direction, i.e. the guide rail 110 may be to adjust the position of the wiper element 108 in a direction perpendicular to the Y direction depending on the relative position between the maintenance cartridge 104 and the wiper assembly 106 in the Y direction. For example, the guide rail 110 may be to adjust the position of the wiper element 108 upwards and downwards.

Additionally or alternatively, the guide rail 110 may also be to adjust the position of the wiper element 108 in the Y direction depending on the relative position between the maintenance cartridge 104 and the wiper assembly 106 in the Y direction, e.g. by pushing or pulling the wiper assembly along the Y direction. For this, the inclination angle of the inclined surface relative to the Y direction may e.g. be larger than 45°. In some examples, the guide rail 110 may additionally or alternatively be to tilt or rotate the wiper element 106, e.g. around an axis in the X or Y direction, depending on the relative position between the maintenance cartridge 104 and the wiper assembly 106 in the Y direction. The wiper assembly 106 may for example be mounted pivotably and the guide rail 110 may be to tilt or rotate the wiper element 108 by pressing against a portion of the wiper assembly 106. In another example, the guide rail 110 may push the wiper assembly 106 along the X direction, e.g. away from the maintenance cartridge 104, when the maintenance cartridge 104 is moved along the Y direction, wherein the print head maintenance assembly 100 may comprise a second guide rail or guiding cam (not shown) that is in contact with the wiper assembly 106 and is to lift the wiper assembly 106 in the Z direction as the wiper assembly 106 is pushed along the X direction. The second guide rail may e.g. be part of or attached to the support frame of the print head maintenance assembly 100 or of the printing device.

Figure 1C:
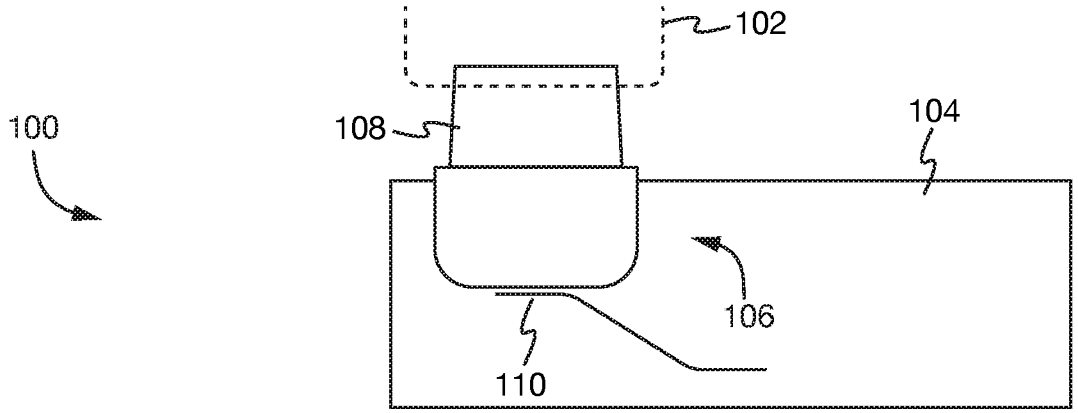

The guide rail 110 may allow for moving the wiper element 108 by moving the maintenance cartridge 104 with the corresponding actuator, i.e. without using a dedicated actuator for the wiper element 108 even though the wiper element 108 may be arranged outside of the maintenance cartridge 104. Thereby, the wiper element 108 may be moved from a disengaged position, in which the wiper element 108 is arranged outside of the path of the print head 102, e.g. as illustrated in FIG. 1*a*, to an engaged position, in which the wiper element 108 is arranged in the path of the print head 102 and may thus come in contact with the print head 102, e.g. as illustrated in FIG. 1*c*. For example, the wiper element 108 may be moved up and down by engagement with the guide rail 110.

In some examples, the guide rail no may comprise an inclined portion extending at an angle to the Y direction as well as a flat portion extending parallel to the Y direction. In the example of FIGS. 1*a*-1*c*, a center portion of the guide rail 110 is an inclined surface, whereas the two opposing end portions of the guide rail 110 are flat surfaces. This may e.g. allow for holding the wiper element 108 in a fixed position such as the engaged or disengaged position while the maintenance cartridge 104 is in a certain range along the Y direction.

Figure 2A:
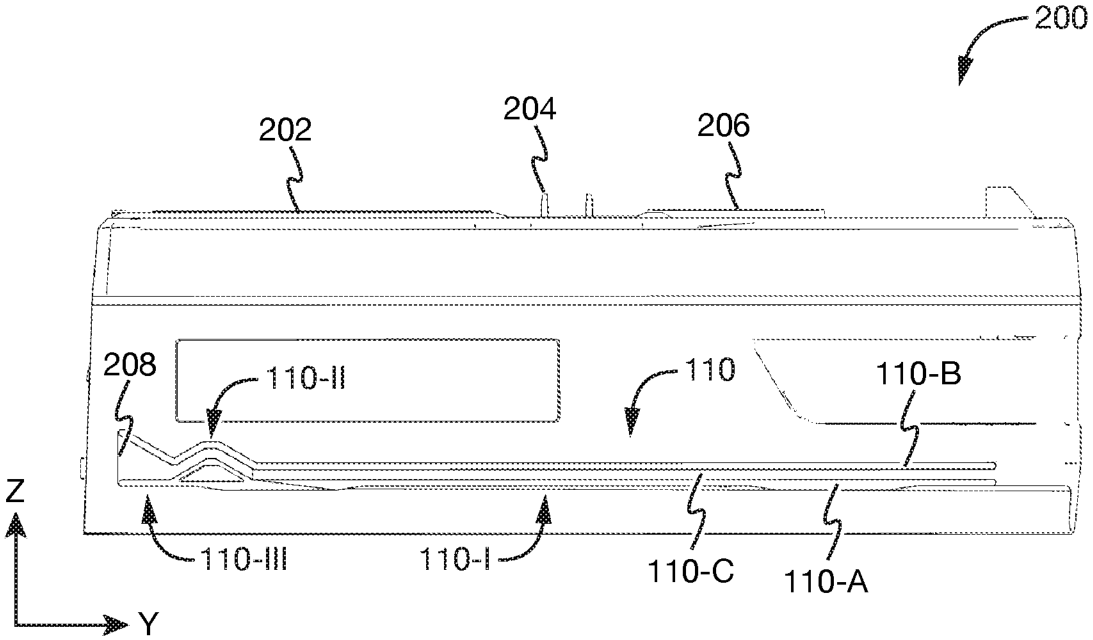
FIG. 2*a*: a maintenance cartridge of a print head maintenance assembly in accordance with an example in side view.
Figure 2B:
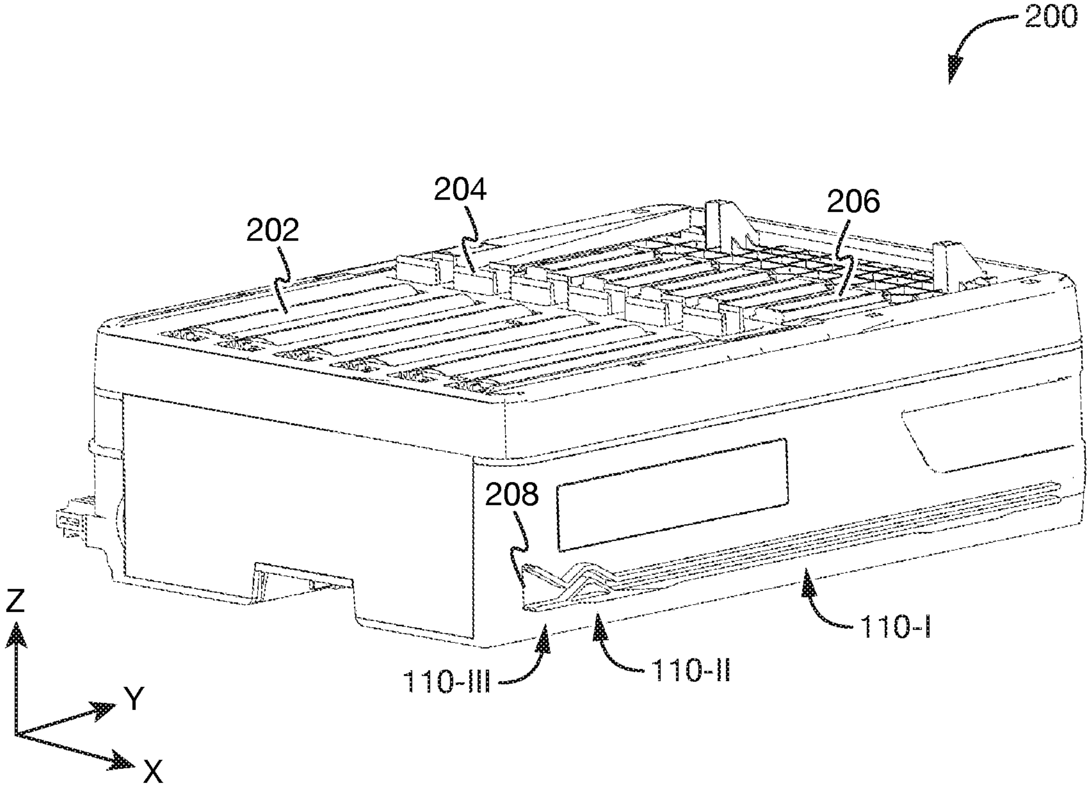
FIG. 2*b*: the maintenance cartridge of FIG. 2*a* according to an example in a perspective view.

FIGS. 2*a* and 2*b* show a schematic illustration of a maintenance cartridge 200 of a print head maintenance assembly in accordance with an example. FIGS. 2*a* and 2*b* depict the maintenance cartridge in side view and in a perspective view, respectively. The maintenance cartridge 200 may for example be part of the print head maintenance assembly 400 described below with reference to FIG. 4 or of the printing device 500 described below with reference to FIG. 5.

The maintenance cartridge 200 may for example comprise a spittoon subsystem 202 with a reservoir for receiving material ejected from a print head. In some examples, the spittoon subsystem 202 may also comprise a split roller for transferring ejected material into the reservoir. The maintenance cartridge 200 may further comprise a wiping subsystem 204 with an additional wiper, which may for example be used for wiping a nozzle plate of a print head in a direction perpendicular to the scanning direction. The maintenance cartridge 200 may also comprise a capping subsystem 206 with a cap for covering the nozzle plate of the print head, e.g. while the print head is not used. In some examples, the maintenance cartridge may comprise a plurality of reservoirs, spit rollers, additional wipers, and/or caps, e.g. one each for every print head of the printing device.

A guide rail 110 is arranged on a side face of the maintenance cartridge 200. In some examples, the guide rail 110 may be similar to the guide rail of the maintenance cartridge 102 of FIGS. 1*a*-1*c*. In the example of FIGS. 2*a*, 2*b*, the guide rail 110 comprises a pair of guiding cams 110-A, 110-B, which may also be referred to as the lower guiding cam 110-A and the upper guiding cam 110-B. The guiding cams 110-A, 110-B form a slot 110-C that extends along the first or Y direction and is to receive a pin of a wiper assembly, e.g. the pin 310 of the wiper assembly 300 as detailed below. In the example of FIGS. 2*a*, 2*b*, the guiding cams 110-A, 110-B are elongated protrusions protruding from the side face of the maintenance cartridge 200. The guiding cams 110-A, 110-B may for example comprise or be formed of a plastic such as polyethylene terephthalate (PET), a metal such as aluminum, or a combination thereof. The guiding cams 110-A, 110-B may be attached to the maintenance cartridge 200 or may be integrally formed with the maintenance cartridge 200. The guiding cams 110-A, 110-B may e.g. be glued to the side face of the maintenance cartridge 200 or molded thereon or may be formed together with the side face of the maintenance cartridge 200, e.g. molded as one piece. In some examples, the guiding cams 110-A, 110-B may e.g. be the upper and lower wall of a longitudinal recess in the side face of the maintenance cartridge 200 forming the slot 110-C, i.e. may not protrude from the side face of the maintenance cartridge 200.

The slot 110-C comprises a flat portion 110-I and an inclined portion 110-II, which together form a main portion of the slot 110-C. In the main portion, the guiding cams 110-A, 110-B may be substantially parallel such that the main portion has a substantially uniform first width perpendicular to the Y-direction and parallel to the side face of the maintenance cartridge 200. The guiding cams 110-A, 110-B may extend parallel to the Y direction in the flat portion 110-I and at an angle to the Y direction in the inclined portion 110-II. In some examples, the inclined portion 110-II may comprise two inclined segments with opposite orientations as illustrated in FIG. 2*a*, e.g. an upwardly inclined segment and a downwardly inclined segment.

In addition, the slot 110-C may comprise an insertion portion 110-III, which may for example be arranged at one end of the guide rail 110 adjacent to the inclined portion 110-II as shown in FIG. 2*a*. The insertion portion has a second width perpendicular to the Y-direction and parallel to the side face of the maintenance cartridge 200. The second width may be larger than the first width. For example, the insertion portion may be shaped like a funnel-cross section. In one example, the second width may be between two and five times as large as the first width. This may facilitate inserting the pin 310 into the slot 110-C. In some examples, the slot 110-C may comprise an opening 208 at one end for inserting the pin 310 into the slot 110-C along the Y direction. The opening 208 may e.g. be arranged in the insertion portion 110-III and may face in the Y direction. As illustrated in FIG. 2*a*, the lower and upper guiding cams 110-A, 110-B may extend at an angle relative to each other in the insertion portion 110-III in some examples, e.g. such that a width of the slot 110-C increases towards the opening 208, which may further facilitate inserting the pin 310 into the slot 110-C. In one example, a width of the opening perpendicular to the Y-direction and parallel to the side face of the maintenance cartridge 200 may be between two and five times as large as the first width.

Figure 4:
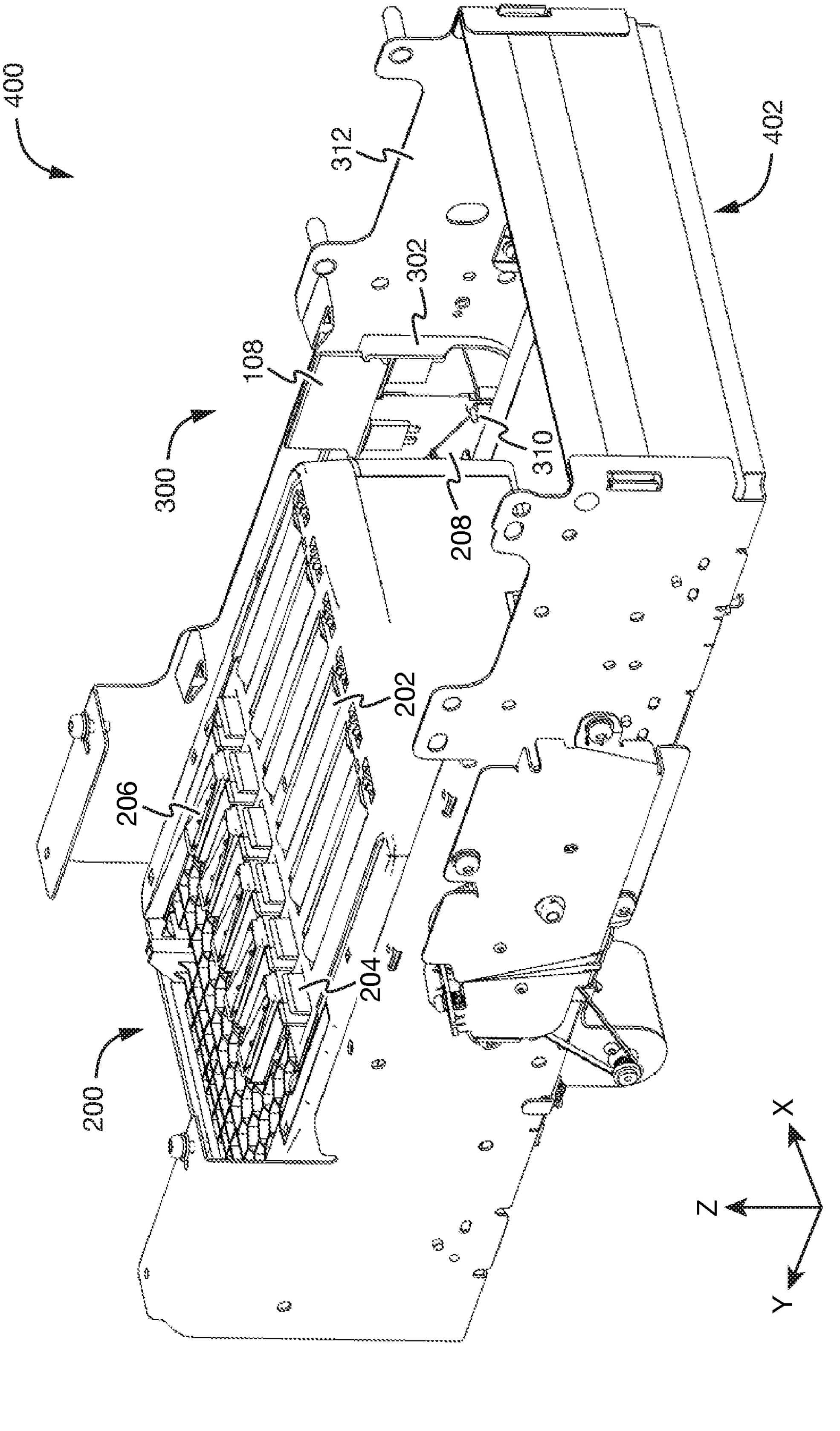
FIG. 4: a print head maintenance assembly with a maintenance cartridge, a wiper assembly and a frame according to an example in a perspective view.

In some examples, the print head maintenance assembly 400 of FIG. 4 may comprise a biasing member such as a spring or elastic body that is to press the pin 310 of the wiper assembly 300 against the lower guiding cam 110-A or the upper guiding cam 110-B. Accordingly, the other one of the guiding cams 110-A, 110-B may not be needed in some cases. The maintenance cartridge 200 may thus not comprise one of the guiding cams 110-A, 110-B in some examples, e.g. similar to the maintenance cartridge 100 of FIG. 1*a*-1*c*.

Figure 3:
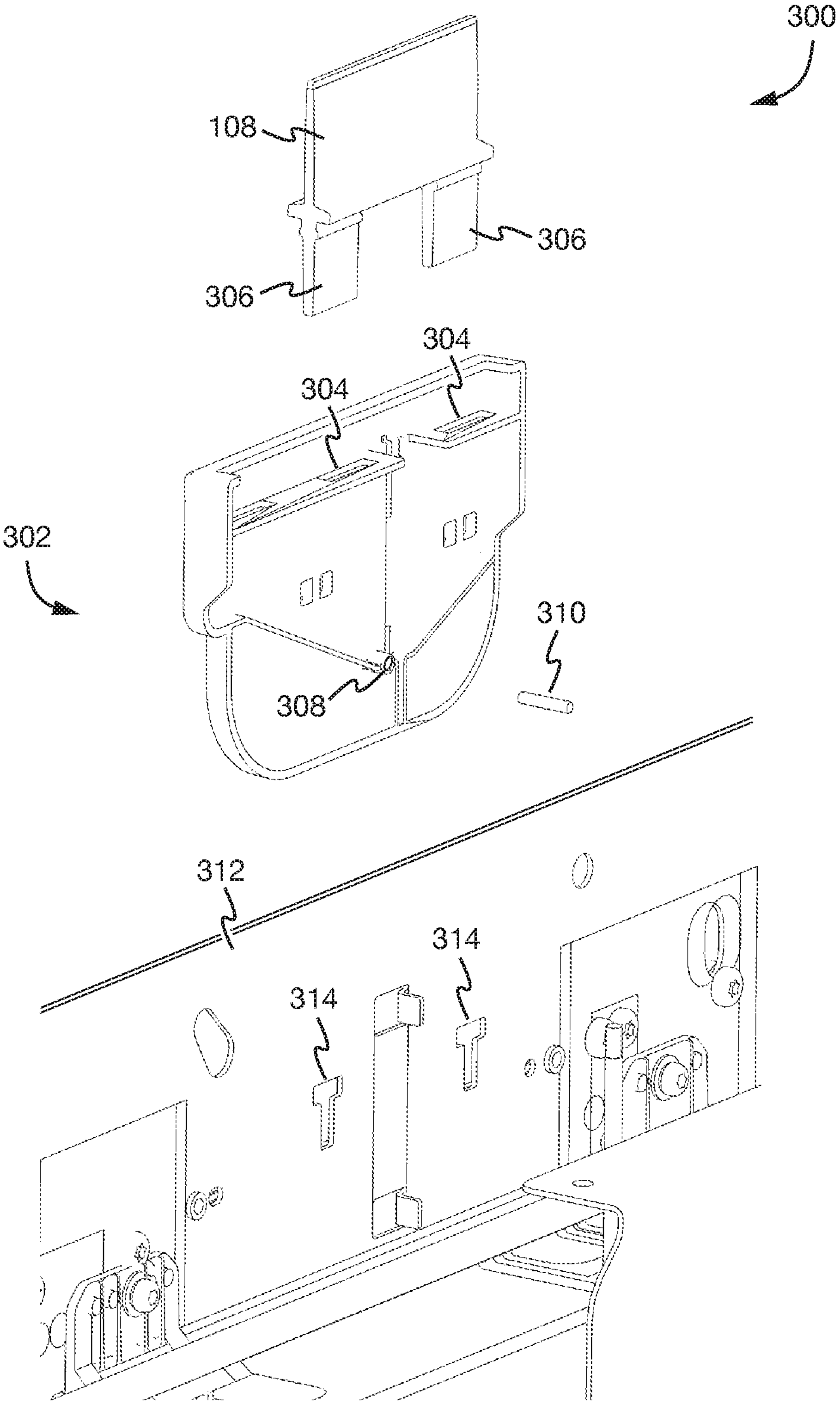
FIG. 3: a wiper assembly of a print head maintenance assembly in accordance with an example in an exploded view.

FIG. 3 shows a schematic illustration of a wiper assembly 300 of a print head maintenance assembly according to an example in an exploded view. The wiper assembly 300 may for example be part of the print head maintenance assembly 400 described below with reference to FIG. 4 or of the printing device 500 described below with reference to FIG. 5.

The wiper assembly 300 comprises a wiper element 108 for wiping a print head. The wiper element 108 may for example comprise or be formed of a flexible material such as a rubber material, e.g. ethylene propylene diene monomer (EPDM) rubber. In some examples, the wiper element 108 may e.g. be a rectangular or trapezoidal plate.

The wiper assembly 300 further comprises a wiper mount 302 that is to removably receive the wiper element 108. In one example, the wiper mount 302 comprises a pair of openings 304 that are to receive a pair of protrusions 306 extending from the wiper element 108, e.g. a pair of protrusions 306 extending parallel to a side surface of the wiper element 108 from a bottom edge/end face of the wiper element 108. The wiper mount 302 may further comprise an opening or recess 308 that is to receive a pin 310. When the pin 310 is arranged in the opening 308, the pin 310 may protrude from the opening 308. The pin 310 may be to engage with a guide rail of a maintenance cartridge, e.g. the guide rail 110 of the maintenance cartridge 200 as detailed below with reference to FIG. 4. The wiper mount 302 and/or the pin 310 may for example comprise or be formed of a plastic such as polyethylene terephthalate (PET), a metal such as aluminum, or a combination thereof. In some examples, the pin 310 and/or the wiper mount 302 may comprise a fastener such as a hook or clip for holding the pin 310 in the opening 308. In other examples, the pin 310 may be permanently fixed in the opening 308, e.g. by gluing the pin 310 to the opening 308. In one example, the pin 310 may be integrally formed with the wiper mount 302. The wiper mount 302 and the pin 310 may for example be molded as one piece. Instead of the pin 310, the wiper mount 302 may also comprise a protrusion or cam follower in some examples, e.g. a protrusion extending downwards from a bottom edge of the wiper mount 302 opposing the openings 304.

The wiper mount 302 is to be mounted or attached to a frame of a print head maintenance assembly and/or of a printing device, e.g. to a wall 312 of a frame as illustrated in FIG. 3. The wiper mount 302 is to be movably attached to the wall 312 such that the wiper element 108 can be moved and/or tilted, e.g. by engaging a guide rail such as the guide rail 110 of the maintenance cartridge 200 with the pin 310. In one example, the wall 312 comprises a pair of longitudinal holes 314 that are to receive a pair of clips or hooks (not shown) of the wiper mount 302, e.g. a pair of clips arranged on a backside of the wiper mount 302 opposing the opening 308. This may allow for slidably attaching the wiper assembly 300 to the frame as the clips of the wiper mount 302 can slide along the holes 314. In some examples, the holes 314 may extend along a direction that is perpendicular to the direction of motion of a maintenance cartridge such as the maintenance cartridge 200 and/or perpendicular to the scanning direction of a print head such as the print head 102 of the printing device 500.

FIG. 4 depicts a schematic illustration of a print head maintenance assembly 400 according to an example in a perspective view. The print head maintenance assembly 400 comprises a frame 402, the maintenance cartridge 200 of FIG. 2 and the wiper assembly 300 of FIG. 3. The maintenance cartridge 200 is arranged in the frame 402 and is movable along the first or Y direction. The frame 402 may be to guide the maintenance cartridge 200 and may separate the print head maintenance assembly 400 from other components of a printing device that the print head maintenance assembly 400 is employed in, e.g. the printing device 500 of FIG. 5. The frame 402 may be part of or attached to a frame or body of the printing device.

The wiper mount 302 of the wiper assembly 300 is slidably attached to a wall 312 of the frame 402, e.g. as described above with reference to FIG. 3. The wiper mount 302 may for example be attached to the wall 312 such that the wiper element 108 can move along the Z direction perpendicular to the Y direction. The pin 310 protruding from the wiper mount 302 faces the side face of the maintenance cartridge 200 on which the guide rail 110 is arranged. By moving the maintenance cartridge 200, the pin 310 may be inserted into and moved along the slot 110-C. The interaction between the pin 310 and the guide rail 110 is described in more detail below with reference to FIG. 7. In some examples, the frame may comprise a spring (not shown) that is to press the wiper mount 302 downwards or upwards, e.g. to ensure a robust contact between the pin 310 and one of the guiding cams 110-A, 110-B.

Figure 5:
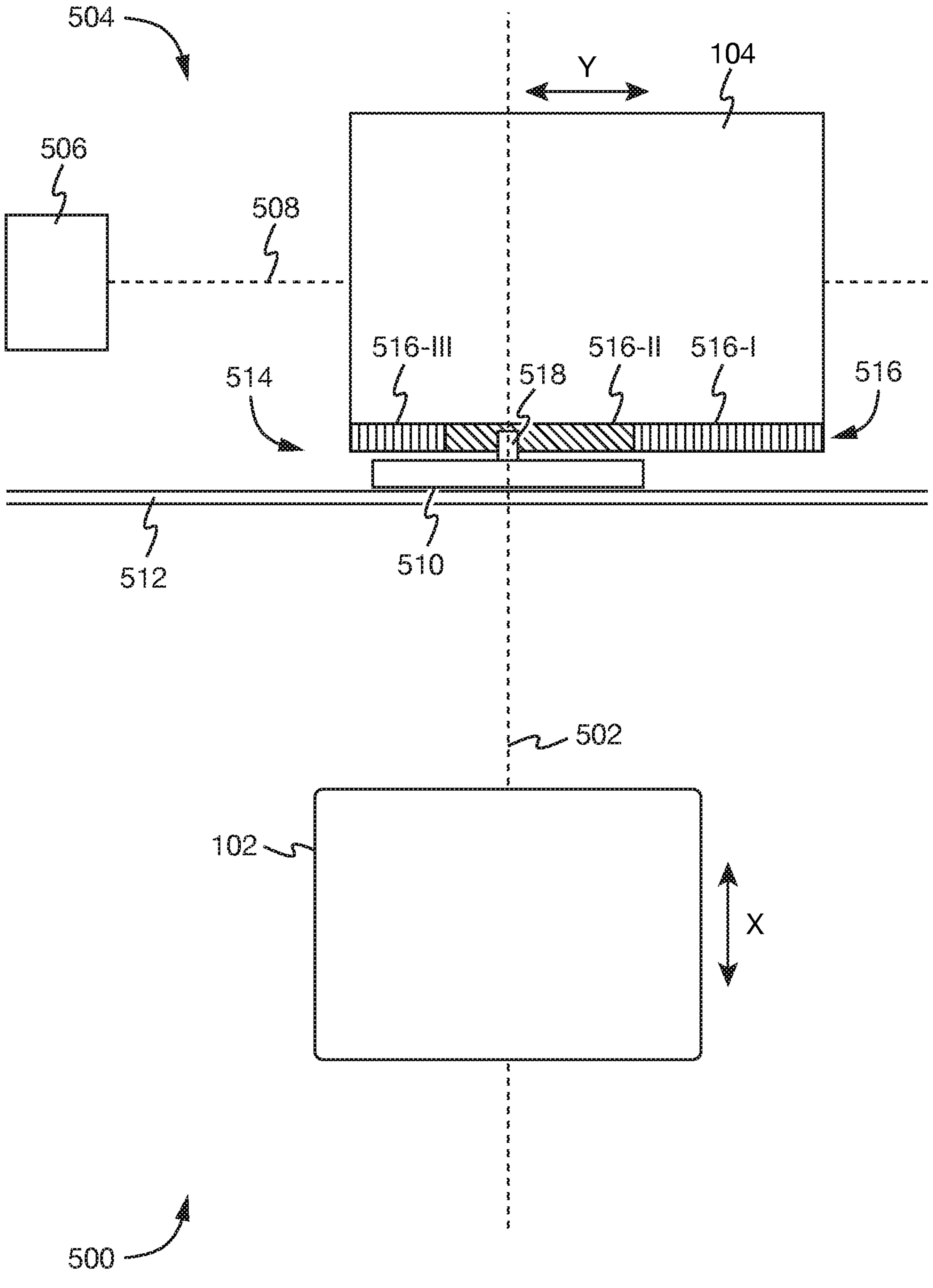
FIG. 5: a printing device in accordance with an example in top view.

FIG. 5 shows a schematic illustration of a printing device 500 in accordance with an example in top view. The printing device 500 comprises a print head 102, which is movable along a print head path 502. The print head path 502 may e.g. extend across a print medium such as paper along a scanning or X direction as indicated by the arrow labeled “X” in FIG. 5. The print head 102 may be to distribute a printing fluid such as ink on the print medium. The printing device 500 may for example be a large-format ink-jet printer. In other examples, the printing device 500 may be a 3D printer, wherein the print head 102 may e.g. be to deposit a binding agent onto a bed of build material. In one example, the print head 102 may be movable along two or three directions.

The printing device 500 further comprises a print head maintenance assembly 504. The print head maintenance assembly 504 may for example be similar to the print head maintenance assembly 100 of FIGS. 1*a*-1*c* or to the print head maintenance assembly 400 of FIG. 4. The print head maintenance assembly 504 comprises a maintenance cartridge 104 and an actuator 506 for moving the maintenance cartridge 104 perpendicular to the print head path 502, e.g. along a transverse path 508 extending along the Y direction as indicated by the arrow labeled "Y" in FIG. 5. The actuator 506 may for example be an electric motor and may be coupled to the maintenance cartridge 104 via a drive belt or a worm drive for moving the maintenance cartridge 104. The maintenance cartridge 104 or at least a part thereof may be user-replaceable or may be permanently installed in the printing device 500.

The print head maintenance assembly 504 further comprises a wiper 510 that is attached to a frame 512 of the printing device 500. In some examples, the wiper 510 may be similar to the wiper assembly 106 of FIGS. 1*a*-1*c* or to the wiper assembly 300 of FIG. 3. The frame 512 may comprise a wall that the wiper 510 is attached to. The wall may e.g. be similar to the wall 312 of the frame 402 of the maintenance assembly 400, i.e. the wiper 510 may be slidably attached to the frame 512.

The wiper 510 is movable between an engaged position and a disengaged position, e.g. as illustrated in FIGS. 1*a*-1*c*. In the engaged position, the wiper 510 is in contact with the print head 102 when the print head 102 is in a wiping position along the print head path 502, i.e. the wiper 510 may be arranged in the path of the print head 102. In the disengaged position, the wiper 510 may be arranged outside of the path of the print head 102, i.e. such that the wiper 510 does not come in contact with the print head 102 even when the print head 102 is in the wiping position. The wiper 510 may for example be arranged below the print head 102 in the direction of view of FIG. 5 and may be lowered and raised along the direction of view of FIG. 5 to disengage and engage the wiper 510, respectively. In the following, the direction of view of FIG. 5 may also be referred to as the Z direction.

For moving the wiper 510, the print head maintenance assembly 504 comprises a positioner 514 that is to move the wiper 510 between the disengaged position and the engaged position depending on the position of the maintenance cartridge 104 perpendicular to the print head path 502, e.g. depending on the position of the maintenance cartridge 104 along the transverse path 508. The positioner 514 may for example comprise a guiding cam 516 and a cam follower 518 that is to engage with the guiding cam 516. The guiding cam 516 may for example be arranged on the maintenance cartridge 104, e.g. on a side face of the maintenance cartridge 104 facing the wall of the frame 512.

In some examples, the guiding cam 516 may be similar to the guide rail of maintenance cartridge in the print head maintenance assembly 100. The guiding cam 516 may e.g. comprise a surface extending along the X and Y directions, wherein the surface may comprise flat portions 516-I and 516-III that are parallel to the Y direction and an inclined portion 516-II that is inclined relative to the Y direction, e.g. similar to the guide rail 110 illustrated FIGS. 1*a*-1*c*. The guiding cam 516 may extend over the entire length of the maintenance cartridge 104 or over a fraction thereof.

In other examples, the guiding cam 516 may be similar to the guide rail of the maintenance cartridge 200. The guiding cam 516 may for example comprise an upper guiding cam and a lower guiding cam, e.g. similar to the guiding cams 110-A, 110-B in FIGS. 2*a*, 2*b*. In some examples, the upper and lower guiding cams are arranged at a substantially uniform first distance. The upper and lower guiding cams may for example extend parallel to each other along a side face of the maintenance cartridge. The upper and lower guiding cams may e.g. extend along the Y direction in FIG. 5 and may be displaced from each other by the first distance along the Z direction or direction of view in FIG. 5. In some examples, end portions of the upper and lower guiding cams may form an opening facing in the Y direction. The opening may e.g. be similar to the opening 208 of the slot 110-C in FIGS. 2*a*, 2*b*. The opening may have a width in a direction parallel to the side face that is larger than the first distance, in one example at least two times as large as the first distance, e.g. between two and five times as large as the first distance.

The cam follower 518 may for example be connected to the wiper 510. The cam follower 518 may e.g. be similar to the pin 310 of the wiper assembly 300 or may be a protrusion extending from the wiper 510, e.g. a protrusion extending along the X direction or the Z direction from a mount of the wiper 510. The wiper 510 may e.g. be attached to the frame 512 such that the cam follower 518 comes in contact with the guiding cam 516 when the maintenance cartridge 104 is in a predetermined range along the transverse path 508, e.g. as detailed below.

In some examples, the positioner 514 may comprise other elements in addition to or instead of the guiding cam 516 and the cam follower 518 to move the wiper 510 between the disengaged position and the engaged position depending on the position of the maintenance cartridge 104 perpendicular to the print head path 502. The positioner 514 may for example comprise a spring (not shown) that is to press the cam follower 518 against the guiding cam 516. In some examples, the positioner 514 may comprise a pivotably mounted lever (not shown) that is engaged with or mechanically coupled to the wiper 510, wherein the maintenance cartridge 104 may come in contact with the lever at a predetermined position along the transverse path 508 and may rotate the lever to move the wiper 510 between the disengaged position and the engaged position when advancing further along the transverse path 508. In another example, the positioner 516 may e.g. comprise a spring and a trigger (not shown) that are to move the wiper 510 between the disengaged position and the engaged position depending on the position of the maintenance cartridge 104 perpendicular to the print head path 502. The spring may be to move the wiper 510 from the disengaged position to the engaged position or vice versa. The trigger may be to release and compress the spring. The trigger may e.g. be a mechanical trigger that is mechanically coupled to the maintenance cartridge 104 or an electromechanical trigger, which may e.g. be triggered by a sensor detecting the position of the maintenance cartridge 104, for example a photoelectric relay. The trigger may e.g. be to release the spring when the maintenance cartridge 104 is in a first position to move the wiper 510 to the engaged position and to release the spring when the maintenance cartridge 104 is in a second position to return the wiper 510 to the disengaged position, e.g. due to gravity and/or a force generated by a second spring. In other examples, the positioner 514 may e.g. comprise a gear drive, a hydraulic system and/or a wire or cord that are to selectively couple the maintenance cartridge 102 to the wiper 510 and to thereby move the wiper 510 depending on the position of the maintenance cartridge 104.

In some examples, the maintenance cartridge 104 may comprise a spittoon subsystem (not shown) with a reservoir that is to receive material ejected from the print head 102. The spittoon subsystem may e.g. be similar to the spittoon subsystem 202 of the maintenance cartridge 200 and may also comprise a spit roller in some examples. The positioner 514 may be to move the wiper 510 to the engaged position when the maintenance cartridge 104 is moved to a spitting position, in which the reservoir is aligned with the print head path 502, i.e. such that the reservoir is located underneath the print head path 502 in the direction of view of FIG. 5. In one example, the flat portion 516-III of the guiding cam 516 may be elevated along the Z direction relative to the flat portion 516-I, e.g. similar to the guide rail 110 in FIG. 1*a*, and may be adjacent to the spittoon subsystem. The guiding cam 518 may be aligned with the print head path 502, e.g. as illustrated in FIG. 5, such that the guiding cam 518 is in contact with the elevated flat portion 516-III when the maintenance cartridge 104 is in the spitting position and the wiper 510 is thus raised to the engaged position.

Figure 6:
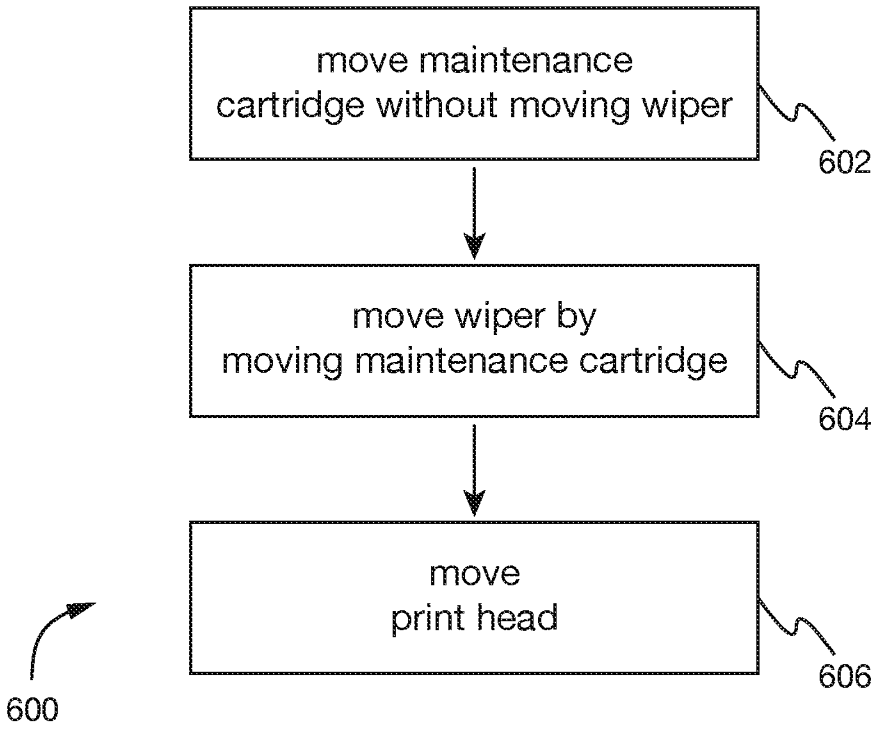
FIG. 6: a method of cleaning a print head in accordance with an example.

FIG. 6 depicts a flow chart of a method 600 of cleaning a print head using a print head maintenance assembly in accordance with an example, wherein the print head maintenance assembly comprises a maintenance cartridge and a wiper. The method 600 may for example be used to clean the print head 102 of the printing device 500 and is described in the following using the printing device 500 of FIG. 5 as an example. Accordingly, the maintenance cartridge 104 is used as an example of a maintenance cartridge and the wiper 510 is used as an example of a wiper. In other examples, a different printing device and/or a different print head maintenance assembly may be used, e.g. the print head maintenance assembly 100 of FIG. 1 or the print head maintenance assembly 400 of FIG. 4, e.g. as described below for the method 700. The method 600 is not limited to the order of execution indicated by the flow chart in FIG. 6. As far as technically feasible, the method 600 may be executed in an arbitrary order and parts thereof may be executed simultaneously at least in part.

The method 600 comprises, in block 602, moving the maintenance cartridge 104 along a first or Y direction without moving the wiper 510. The maintenance cartridge 104 is moved perpendicular to the print head path 502 of the print head 102, e.g. along the transverse path 508. The maintenance cartridge 104 is moved from a first position to a second position.

In some examples, the wiper 510 may not be mechanically engaged with the maintenance cartridge 104 when the maintenance cartridge 104 is at the first position and/or between the first and second positions. In the context of this disclosure, the wiper 510 not being mechanically engaged with the maintenance cartridge 104 may refer to a situation in which the wiper 510 is not in contact with or coupled to the maintenance cartridge 104 or is in contact with or coupled to the maintenance cartridge 104 in a way that permits moving the maintenance cartridge 104 without moving the wiper 510. Accordingly, when the maintenance cartridge 104 is at the first position and/or between the first and second positions, the cam follower 518 connected to the wiper 510 may e.g. not be in contact with the guiding cam 516 and/or may be in contact with a flat portion of the guiding cam 516, e.g. with the flat portion 516-I. Accordingly, the cam follower 518 may e.g. slide horizontally along the flat portion 516-I when moving the maintenance cartridge 104. No force is applied to the wiper 510 such that the wiper 510 remains in place. The wiper 510 may for example remain in a disengaged position while the maintenance cartridge 104 is moved from the first to the second position. In some examples, the second position may be the position at which the wiper 510 mechanically engages with the maintenance cartridge 104, e.g. as detailed below for block 604. In other examples, the wiper 510 may not be mechanically engaged with the maintenance cartridge 104 when the maintenance cartridge 104 is at the second position.

The method 600 further comprises, at block 604, moving the wiper 510 from a disengaged position to an engaged position. In the disengaged position, the wiper 510 is arranged outside of the print head path 502, e.g. since the wiper 510 is lowered such that the print head 102 cannot come in contact with the wiper 510. In the engaged position, the wiper 510 is arranged in the print head path 502, e.g. since the wiper 510 is raised such that the print head 102 can come in contact with the wiper 510 when moved to a wiping position along the print head path 502 above the wiper 510.

The wiper 510 is moved by mechanically engaging the wiper 510 with the maintenance cartridge 104 and moving the maintenance cartridge 104 along the Y direction from the second position to a wiping position. In the context of this disclosure, mechanically engaging the wiper 510 with the maintenance cartridge 104 is to be understood as mechanically coupling the wiper 510 to the maintenance cartridge 104 such that a motion of the maintenance cartridge 104 may induce a motion of the wiper 510, e.g. due to a force on the cam follower 518 generated by the guiding cam 516, e.g. by the inclined portion 516-II.

In some examples, the wiper 510 may engage with the maintenance cartridge 104 when the maintenance cartridge 104 is at the second position. The second position may e.g. be the position at which the cam follower 518 comes in contact with the inclined portion 516-II. In other examples, the wiper 510 may engage with the maintenance cartridge 104 when the maintenance cartridge 104 is at a position between the second position and the wiping position. When the maintenance cartridge 104 is in the wiping position, the cam follower 518 may for example be in contact with the elevated flat portion 516-III and may e.g. be arranged at the center of the elevated flat portion 516-III. As the maintenance cartridge 104 is moved from the second position to the wiping position, the cam follower 518 may slide along the inclined portion 516-II, thereby pressing the wiper 510 upwards from the disengaged position to the engaged position (cf. FIGS. 1*a*-1*c*).

In other examples, the wiper 510 may additionally or alternatively engage with the maintenance cartridge 104 and/or be moved by the maintenance cartridge 104 by other means, e.g. as described above for the positioner 514 of the printing device 500.

The method 600 also comprises, at block 606, moving the print head 102 along the print head path 502 while the wiper 510 is in the engaged position to wipe a nozzle plate of the print head 102 with the wiper 510. For this, the maintenance cartridge 104 may for example be kept in the wiping position, e.g. such that the cam follower 518 is placed at the center of the elevated flat portion 516-III. In some examples, the print head 102 may be moved back and forth across the wiper 510 in block 606.

Figure 7:
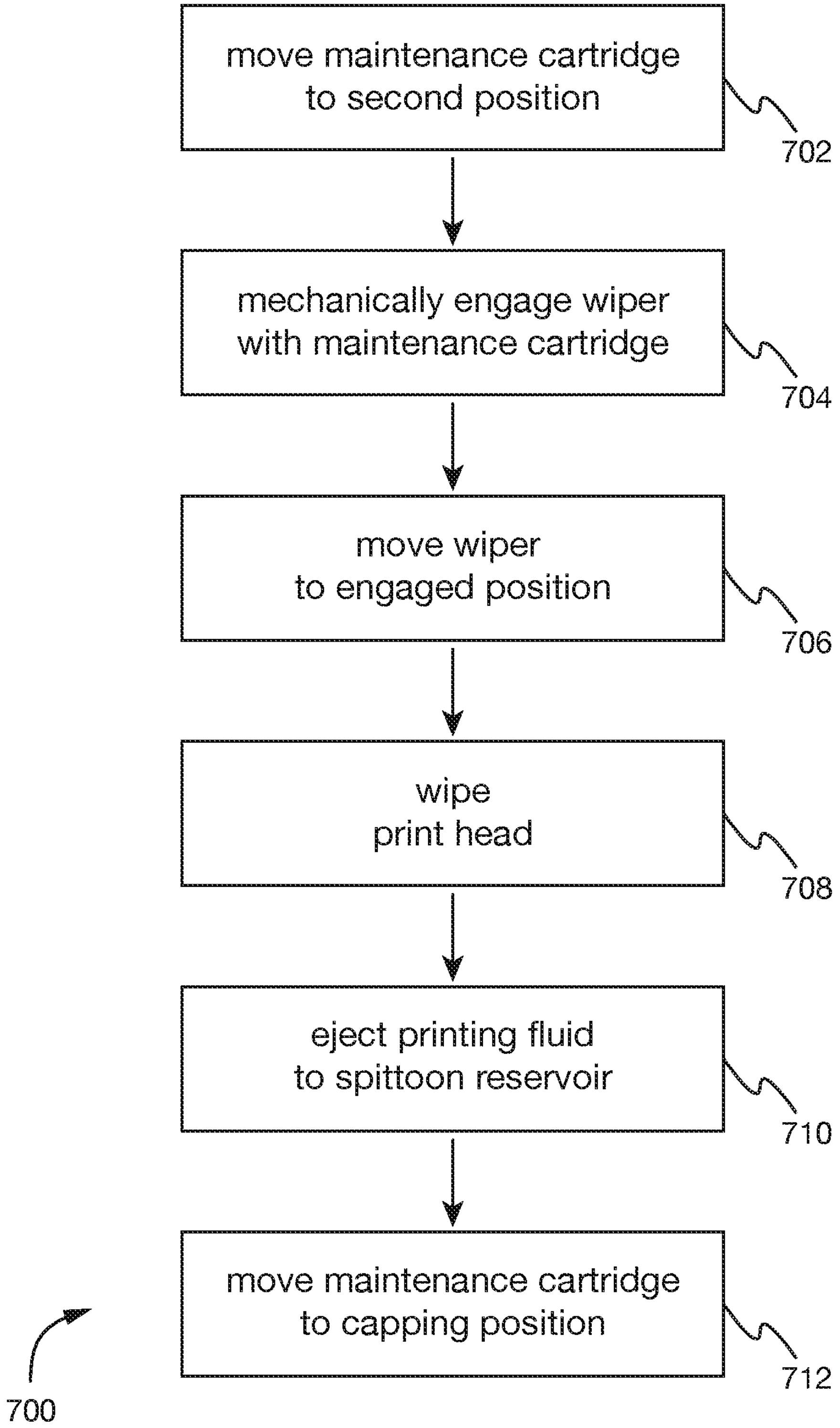
FIG. 7: a method of cleaning a print head according to another example.

FIG. 7 depicts a flow chart of a method 700 of cleaning a print head using a print head maintenance assembly with a maintenance cartridge and a wiper according to another example. The method 700 is similar to the method 600 and is described in the following using the printing device 500 of FIG. 5 and the print head maintenance assembly 400 of FIG. 4 as examples. Accordingly, the maintenance cartridge 200 is used as an example of a maintenance cartridge and the wiper assembly 300 is used as an example of a wiper. In other examples, a different printing device and/or a different print head maintenance assembly may be used, e.g. the print head maintenance assembly 100 of FIG. 1 or the print head maintenance assembly 504 of FIG. 5. The method 700 is not limited to the order of execution indicated by the flow chart in FIG. 7. As far as technically feasible, the method 700 may be executed in an arbitrary order and parts thereof may be executed simultaneously at least in part.

The method 700 comprises, at block 702, moving the maintenance cartridge 200 along the first or Y direction perpendicular to the print head path 502 of the print head 102 from a first position to a second position without moving the wiper assembly 300, e.g. similar as described above for block 602 of method 600.

The first position may for example be the position in which the maintenance cartridge 200 is depicted in the example of FIG. 4, i.e. a first end position at one end of the frame 402. In the first end position, the pin 310 is located outside of the slot 110-C adjacent to the opening 208 and the wiper assembly 300 is not mechanically engaged with the maintenance cartridge 200. The wiper assembly 300 may be in the disengaged position, e.g. due to gravity and/or a spring pressing the wiper assembly 300 downwards. As the maintenance cartridge 200 is moved away from the first end position, e.g. along the negative Y direction in FIG. 4, the pin 310 may enter the insertion portion 110-III through the opening 208. In the insertion portion 110-C, the width of the slot 110-C may decrease as depicted in FIGS. 2*a*, 2*b* such that the pin 310 may be guided towards the inclined portion 110-II by the guiding cams 110-A, 110-B. The second position may for example be a position in which the pin 310 is arranged in the opening 208 or within the insertion portion 110-III. In some examples, the second position may be the position at which the wiper assembly 300 mechanically engages with the maintenance cartridge 200, e.g. as detailed below. In other examples, the first and second positions may e.g. be positions in which the pin 310 is arranged within the flat portion 110-I or outside of the slot 110-C adjacent to the flat portion 110-I. Accordingly, the pin 310 may slide along the flat portion 110-I when moving the maintenance cartridge 200 from the first to the second position. No force is applied to the wiper assembly 300 and the wiper assembly 300 remains in place.

The method 700 further comprises, at block 704, mechanically engaging the wiper assembly 300 with the maintenance cartridge 200. This may comprise moving the maintenance cartridge 200 along the Y direction in some examples, e.g. past the second position. Mechanically engaging the wiper assembly 300 to the maintenance cartridge 200 may comprise engaging a pin that is attached to the wiper assembly 300, e.g. the pin 310, with a guiding surface that is arranged on a side face of the maintenance cartridge 200 and inclined relative to the Y direction, e.g. a surface of the inclined portion 110-II of the slot 110-C.

In the example of FIG. 4, the pin 310 may come in contact with the upper and/or lower guiding cams 110-A, 110-B and thereby mechanically engage the wiper assembly 300 with the maintenance cartridge 200. The pin 310 may in particular come in contact with an inclined surface of the upper and/or lower guiding cams 110-A, 110-B, e.g. in the inclined portion 110-II, such that a motion of the maintenance cartridge 200 along the Y direction generates a force on the wiper assembly 300 along the Z direction due to the inclination of the inclined surface. In some examples, the second position may thus be the position at which the pin 310 comes enters the inclined portion 110-II.

In some examples, mechanically engaging the wiper assembly 300 with the maintenance cartridge 200 may comprise guiding the pin 310 towards the inclined portion 110-II, e.g. by bringing the pin 310 in contact with an inclined surface of the guiding cams 110-A, 110-B in the insertion portion 110-III. This may allow for reliably capturing the pin 310 in the slot 110-C irrespective of an initial position of the wiper assembly 300.

The method 700 further comprises, at block 706, moving the wiper assembly 300 from the disengaged position to the engaged position, thereby placing the wiper element 108 in the print head path 502. The wiper assembly 300 is moved by moving the maintenance cartridge 200 to the wiping position, e.g. from the second position. The wiping position may e.g. be the position at which the pin 310 is at the highest point of the inclined portion 110-II along the Z direction, e.g. at the center of the inclined portion 110-II as illustrated in FIG. 2*a*.

Moving the wiper assembly 300 from the disengaged position to the engaged position may comprise moving the pin 310 along a guiding surface by moving the maintenance cartridge from the second position to the wiping position. When moving the maintenance cartridge 200 in the example of FIG. 4, the pin 310 may slide along a surface of the lower guiding cam 110-A in the inclined portion 110-II of the slot 110-C and the surface of the lower guiding cam 110-A may press the maintenance assembly 300 upwards to the engaged position.

In block 708, the print head 102 is moved along the print head path 502 while the wiper assembly 300 is in the engaged position to wipe a nozzle plate of the print head 102 with the wiper element 108, e.g. as described above for block 606 of method 600.

The method 700 may further comprise, in block 710, ejecting printing fluid from the print head 102 to a reservoir. The maintenance cartridge 200 may for example comprise a spittoon subsystem such as the spittoon subsystem 202 described above with reference to FIGS. 2*a*, 2*b*. In block 710, the print head 102 may be moved to a spitting position along the print head path 502 and printing fluid may be ejected from nozzles of the print head 102, e.g. to prevent the nozzles from clogging. In some examples, block 710 may also comprises moving the maintenance cartridge 200 to a spitting position along the transverse path 508, in which the reservoir and/or a spit roller of the spittoon subsystem 202 is aligned with the print head path 502. In other examples, the spitting position of the maintenance cartridge 200 may correspond to the wiping position of the maintenance cartridge 200 and the maintenance cartridge 200 may not be moved in block 710.

In some examples, the maintenance cartridge 200 may comprises a capping subsystem such as the capping subsystem 206 with a cap for covering the print head 102, e.g. a cap for covering a nozzle plate of the print head 102. The method 700 may further comprise, in block 712, moving the maintenance cartridge 200 between the wiping position and a capping position. When the maintenance cartridge 200 is in the capping position, the cap may cover the nozzle plate of the print head 102, e.g. when the print head 102 is at a capping position along the print head path 502. In some examples, the wiper assembly 300 may be in the disengaged position when the maintenance cartridge 200 is in the capping position. The pin 310 may for example be arranged in the flat portion 110-I of the slot 110-C when the maintenance cartridge 200 is in the capping position.

In some examples, block 712 may be executed after blocks 706 and 708 with the maintenance cartridge 200 initially in the wiping position and may comprise moving the maintenance cartridge 200 from the wiping position to the capping position, e.g. after the printing device 500 has finished a print job. In other examples, block 712 may be executed before blocks 706 and 708 with the maintenance cartridge 200 initially in the capping position, e.g. after switching on the printing device 500 or prior to execution of a print job. Accordingly, block 712 may comprise moving the maintenance cartridge 200 from the capping position to the wiping position.

The methods 600 and 700 may also comprise additional elements which are not illustrated in FIGS. 6 and/or 7. For example, the methods 600 and 700 may further comprise wiping the print head 102 using the additional wiper of the wiping subsystem 204 of the maintenance cartridge 200 by moving the maintenance cartridge 200 along the transverse path 508.

The methods 600, 700 may be part of a regular maintenance routine of a printing device, which may e.g. be executed when switching on the printing device, at the beginning and/or end of a print job and/or in regular intervals. In some examples, the methods 600, 700 may be executed whenever a new print head is installed in the printing device and/or whenever the printing device was opened or serviced.

Wiping the print head 102 by moving the print head 102 along the print head path 502 across a wiper 510 oriented perpendicular to the print head path 502 may for example reduce the risk of damaging nozzles of the print head 102 and/or the number of damaged nozzles compared to wiping perpendicular to the print head path 502 when wiping off contaminants such as dirt particles. These may e.g. accumulate on the print head 102 during manufacture or transport or when opening or servicing the printing device 500.

The description is not intended to be exhaustive or limiting to any of the examples described above. The print head maintenance assembly, the printing device and the method of cleaning a print head disclosed herein can be implemented in various ways and with many modifications without altering the underlying basic properties.

The invention claimed is:

1. A print head maintenance assembly, the print head maintenance assembly comprising:
- a maintenance cartridge that is moveable along a first direction;
- a wiper assembly comprising a wiper element for wiping a print head, the wiper element extending along the first direction; and
- an actuator to move the maintenance cartridge along the first direction, wherein:
- the maintenance cartridge comprises a guide rail extending along the first direction;
- the guide rail is to engage with the wiper assembly to adjust a position of the wiper element depending on a relative position between the maintenance cartridge and the wiper assembly in the first direction, and
- the actuator is to move the maintenance cartridge along the first direction without moving the wiper element along the first direction.

2. The print head maintenance assembly of claim 1, wherein the guide rail is to adjust the position of the wiper element in a second direction perpendicular to the first direction.

3. The print head maintenance assembly of claim 2, wherein the guide rail comprises a flat portion extending parallel to the first direction and an inclined portion extending at an angle to the first direction.

4. The print head maintenance assembly of claim 1, wherein the wiper assembly is slidably attached to a frame of the print head maintenance assembly.

5. The print head maintenance assembly of claim 1, wherein the wiper assembly comprises a protruding pin that is to engage with the guide rail.

6. The print head maintenance assembly of claim 5, wherein the guide rail comprises a slot that is to receive the pin of the wiper assembly, wherein the slot is arranged on a side face of the maintenance cartridge and extends along the first direction.

7. The print head maintenance assembly of claim 6, wherein the slot comprises a main portion having a first width and an insertion portion having a second width larger than the first width.

8. The print head maintenance assembly of claim 1, wherein the wiper assembly comprises a wiper mount that is to removably receive the wiper element.

9. The print head maintenance assembly of claim 1, wherein the wiper element is to remain in a fixed position along the first direction when the guide rail adjusts the position of the wiper element in a second direction perpendicular to the first direction.

* * * * *